(12) United States Patent
Hall

(10) Patent No.: US 8,997,486 B2
(45) Date of Patent: Apr. 7, 2015

(54) COMPRESSOR WHEEL

(75) Inventor: David M. Hall, Muskegon, MI (US)

(73) Assignee: Bullseye Power LLC, Muskegon, MI (US)

( * ) Notice: Subject to any disclaimer, the term of this patent is extended or adjusted under 35 U.S.C. 154(b) by 495 days.

(21) Appl. No.: 13/428,101

(22) Filed: Mar. 23, 2012

(65) Prior Publication Data

US 2013/0251533 A1    Sep. 26, 2013

(51) Int. Cl.
| | |
|---|---|
| F02B 33/44 | (2006.01) |
| F04D 29/38 | (2006.01) |
| F01D 5/22 | (2006.01) |
| F02B 37/00 | (2006.01) |
| F04D 29/32 | (2006.01) |
| F04D 29/28 | (2006.01) |
| F02D 41/00 | (2006.01) |
| B60W 20/00 | (2006.01) |

(52) U.S. Cl.
CPC ............... *F02B 37/00* (2013.01); *F04D 29/38* (2013.01); *F04D 29/328* (2013.01); *F04D 29/282* (2013.01); *F02D 41/0007* (2013.01); *B60W 20/1082* (2013.01)

(58) Field of Classification Search
CPC .......... F02B 37/00; F02B 37/02; F02B 37/18; F02D 41/0007; F02D 29/38; F02D 29/328; F02D 29/282; B60W 20/1082
USPC ......... 60/605.1, 602; 416/203, 186 R, 223 R, 416/183, 180, 237
IPC ............................................ F04D 29/38, 29/30
See application file for complete search history.

(56) References Cited

U.S. PATENT DOCUMENTS

| | | | |
|---|---|---|---|
| 3,205,828 A * | 9/1965 | Rupp | 415/208.3 |
| 3,481,531 A * | 12/1969 | MacArthur et al. | 416/203 |
| 3,904,308 A * | 9/1975 | Ribaud | 416/183 |
| 1,956,887 A | 5/1978 | MacDonald | |
| 4,235,484 A * | 11/1980 | Owen et al. | 417/407 |
| 4,502,837 A * | 3/1985 | Blair et al. | 416/183 |
| 4,877,370 A * | 10/1989 | Nakagawa et al. | 415/208.4 |
| 4,901,920 A * | 2/1990 | Wollin | 416/237 |
| 5,120,196 A * | 6/1992 | By et al. | 416/180 |
| 5,213,473 A * | 5/1993 | Fiala | 416/183 |
| 6,210,109 B1 * | 4/2001 | Will et al. | 416/183 |
| 6,418,722 B1 | 7/2002 | Arnold | |
| 6,524,081 B2 | 2/2003 | Wu | |
| 7,367,189 B2 * | 5/2008 | Ishiwatari | 60/602 |
| 7,428,814 B2 | 9/2008 | Pedersen et al. | |
| 7,686,586 B2 | 3/2010 | Nikpour | |
| 2007/0154314 A1 * | 7/2007 | Jarrah et al. | 416/203 |
| 2008/0276613 A1 | 11/2008 | Noelle et al. | |
| 2009/0285687 A1 | 11/2009 | Yagami et al. | |

(Continued)

FOREIGN PATENT DOCUMENTS

| | | | | |
|---|---|---|---|---|
| GB | 1129370 | * 10/1968 | | F04D 29/30 |
| JP | 2115596 | 4/1990 | | |
| JP | 2012140899 A | * 7/2012 | | F04D 29/30 |

*Primary Examiner* — Thai Ba Trieu
(74) *Attorney, Agent, or Firm* — Butzel Long

(57) ABSTRACT

A compressor wheel for use with turbochargers or superchargers for forced air induction of internal combustion engines includes a base having a hub portion, and a plurality of blades extending from the base, each blade having a length defined by the distance between opposite axial extremities of the blade, the plurality of blades including at least three different types of blades, each having a substantially different length.

12 Claims, 2 Drawing Sheets

(56) References Cited

U.S. PATENT DOCUMENTS

| | | |
|---|---|---|
| 2010/0263373 A1 | 10/2010 | Decker et al. |
| 2011/0135449 A1 | 6/2011 | Parker et al. |
| 2011/0252791 A1 | 10/2011 | Lotterman et al. |
| 2011/0277477 A1 | 11/2011 | Filippone |
| 2011/0318188 A1 | 12/2011 | Billotey et al. |
| 2013/0266450 A1* | 10/2013 | Tomita et al. ............. 416/223 R |

* cited by examiner

COMPRESSOR WHEEL

CROSS-REFERENCE TO RELATED APPLICATIONS

Not Applicable.

FIELD OF THE DISCLOSURE

The subject matter disclosed and claimed herein relates to compressor wheels used for forced air induction, such as those used in turbochargers or superchargers.

BACKGROUND OF THE DISCLOSURE

Forced induction is a process in which an air compressor is used for delivering compressed air to the intake of an internal combustion engine. Forced induction increases engine power and efficiency by increasing the total compression ratio and thermal efficiency of the entire system. Forced induction compressors are typically either turbochargers or superchargers. A turbocharger is an air compressor driven by a turbine that is turned by exhaust gases from the engine, with the turbine wheel and compressor wheel being on a common shaft. A supercharger is an air compressor that is mechanically driven by the crank shaft of the engine, typically by a belt, gear or chain.

The compressor wheels used for forced induction of internal combustion engines typically have a back plate supporting a plurality of blades that extend radially from a central hub and axially from the back plate.

The blades of a typical compressor wheel used for forced air induction are shaped to draw air axially into the compressor housing, accelerate the air centrifugally, and discharge the air radially from the compressor at a higher pressure.

SUMMARY OF THE DISCLOSURE

Disclosed is a compressor wheel comprising a base having a disk portion and a hub portion and a plurality of blades affixed to the base, each blade extending radially from the hub portion of the base and axially from the disk portion of the base and having a first edge extending in a substantially axially direction and a second edge extending in a substantially radially direction, the first and second edges intersecting at a tip of the blade, the plurality of blades including at least three different types of blades, each of the different types of blades having a dimension that is substantially different from the other types of blades.

In certain embodiments, the compressor wheel includes different types of blades having different lengths.

For certain embodiments, each of the different types of blades has a length that is at least 0.1 inches (2.54 millimeters) different from the length of the other types of blades.

In certain embodiments, each of the different types of blades has a different length, the length of each type of blade being at least 5% greater than the length of any different type of blade having a shorter length.

In accordance with certain embodiments, the plurality of blades are arranged on the base or hub such that adjacent blades are of different types.

In certain embodiments, there are exactly three different types of blades, each of the different types of blades having a different length, including a long type of blade having a length at least 5% greater than the length of each of the other two types of blades, an intermediate type of blade having a length less than the length of the long blades and at least 5% greater than the length of a short type of blade, the short type of blade having a length less than the length of the other types of blades.

In accordance with certain embodiments, the total number of blades is an integer multiple of two (i.e., an even number) or four, and the blades are arranged around the hub, either clockwise or counterclockwise, in a repeating sequence of tall blade, short blade, intermediate blade, and short blade.

In accordance with certain other embodiments, the total number of blades is an integer multiple of three, and the blades are arranged around the hub, either clockwise or counterclockwise, in a repeating sequence of tall blade, short blade, and medium blade.

In certain embodiments, the total number of blades is 12, 14, 16 or 18 and there are three different types of blades of different lengths arranged around the hub, either clockwise or counterclockwise, in a repeating sequence of tall blade, short blade, intermediate blade, and short blade.

In accordance with certain embodiments, the total number of blades is 9, 12, 15 or 18, and there are three different types of blades arranged around the hub, either clockwise or counterclockwise, in a repeating sequence of tall blade, short blade, and medium blade.

In certain embodiments, the hub portion includes a cylindrical portion that smoothly transitions into a bell-shaped portion.

In certain embodiments, the compressor wheel includes a base, and a plurality of blades extending from the base, each blade having a length defined by the distance between opposite axial extremes of the blade, the plurality of blades including at least three different types of blades, each having a substantially different length.

Also disclosed are certain embodiments in which the compressor wheel is part of a compressor comprising a compressor housing and a compressor wheel as generally described herein disposed within the compressor housing. The compressor can be part of a turbocharger or a component of a supercharger system used for forced air induction in an internal combustion engine of a vehicle.

In certain embodiments, the compressor wheel is part of a turbocharger having a shaft journaled within a housing, a turbine mounted on the shaft, the turbine and housing configured to receive combustion exhaust gases radially at an inlet and discharge the exhaust gases axially, and a compressor wheel as described herein mounted on another end of the shaft, the compressor wheel and housing configured to receive air from an axially oriented inlet and discharge compressed air radially.

In accordance with certain embodiments, the turbocharger described herein is incorporated into a motor vehicle comprising an internal combustion engine mounted on the vehicle, a turbocharger mounted on the vehicle, exhaust conduit for conveying products of combustion exhausted from the internal combustion engine to an exhaust gas inlet of the turbine, and a compressed air conduit for conveying compressed air from an outlet of the compressor to an air inlet of the internal combustion engine.

DESCRIPTION OF ILLUSTRATED EMBODIMENTS

Figure 1:
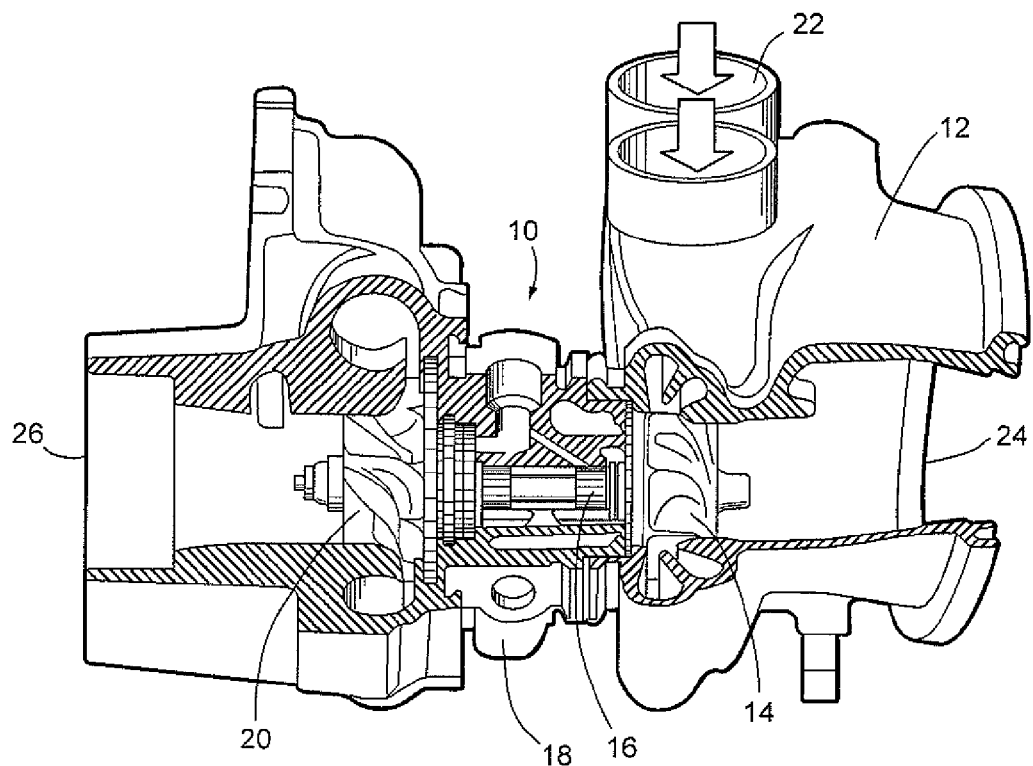
FIG. 1 is a schematic view of a turbocharger used for forced air induction on an internal combustion engine.

Shown in FIG. 1 is a turbocharger 10 having a sealed turbine housing 12 containing a turbine wheel 14 mounted on one end of a shaft 16 journaled within a shaft bearing housing 18 and a compressor wheel 20 mounted on an opposite end of shaft 16. Exhaust gases from an internal combustion engine enter the turbine section of the turbocharger axially through turbine exhaust gas inlets 22 causing turbine wheel 14 to rotate shaft 16 and compressor wheel 20. The exhaust gases exit the turbine section of the turbocharger from turbine exhaust gas outlet 24 at a lower pressure. Air enters the compressor section of the turbocharger axially through compressor air inlet 26 and is discharged radially at a higher pressure which is conveyed via conduit to the air inlet of an internal combustion engine to improve engine performance and efficiency.

Although compressor wheel 20 is illustrated in a turbocharger, it may also be advantageously used in a supercharger having a compressor similar to the compressor illustrated on the turbocharger 10, with shaft 16 mechanically coupled directly or indirectly to the engine crankshaft such as by a belt, chain or gear.

Figure 2:
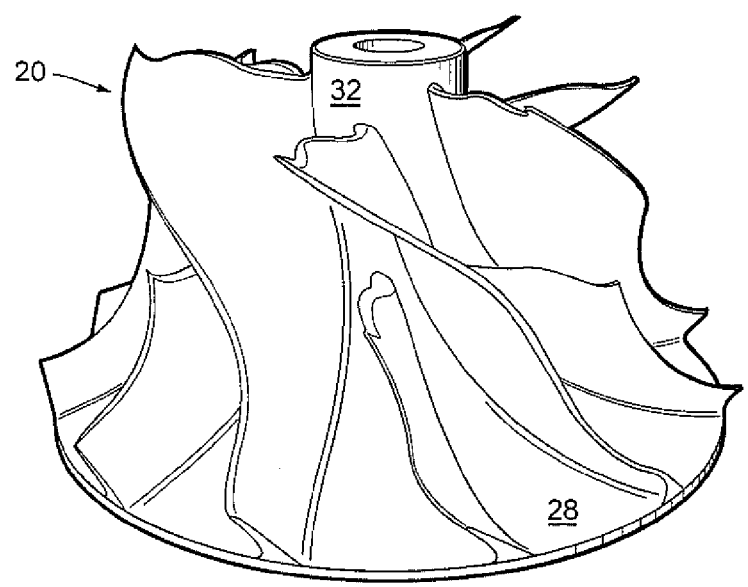
FIG. 2 is a perspective of a compressor wheel having three different types of blades of different length.

Shown in FIG. 2 is a compressor wheel 20 having a base 28 including a disk portion 20 and a hub portion 32, and a plurality of blades 34, 36 and 38 which extend radially outwardly and axially upwardly from the base.

In the illustrated embodiment, compressor wheel 20 includes three different types of blades 34, 36, and 38 having different lengths, including relatively long blades 34, relatively short blades 36, and blades of intermediate lengths 38.

Very minor variations in the dimensions of the blades of conventional compressor wheels are expected due to irregularities or variances in the manufacturing processes or equipment. The requirement for different types of blades having at least one dimension that is substantially different from the other types of blades involves substantial differences that exceed the ordinary manufacturing variances or tolerances that are routinely accepted. Typically, acceptable variances are about 0.01 inches or less, with variances up to about 0.05 inches being insubstantial. Thus, a substantial difference in a blade dimension, such as a blade length, is a difference greater than 0.01 inches or greater than 0.05 inches. Therefore, for purposes of this disclosure, blades that have slightly different dimensions within accepted tolerances and/or which have insubstantial differences in dimension are not regarded as being different types of blades. It is believed that the improved performance provided by utilizing at least three different types of blades, each having a dimension that is substantially different from the other types of blades, requires a difference, such as a difference in length, that is at least about 0.1 inches (2.54 millimeters). It is believed that an even greater improvement in performance can be achieved when the difference in dimension is at least 5%. For example, each of three different types of blades can have a different length, with the length of the longest blade being at least 5% greater than the length of the intermediate length blade, and the intermediate length blade being at least 5% longer than the short blade.

Typically, base 28 and blades 34, 36 and 38 are part of an integral component. For example, compressor wheel 20 can be machined from a single piece of metal to provide a unitary structure without any components being welded, soldered, or otherwise fused or joined together. As another alternative, a unitary structure can be cast. While unitary structures are believed to be more desirable, advantages of the improved structure can be achieved by welding or otherwise attaching separately fabricated blades (e.g., blades 34, 36 and 38) to base 28.

Compressor wheel 20 may be made of aluminum, titanium or other suitable material. Suitable materials may include metal alloys exhibiting high strength to weight characteristics comparable to or better than aluminum or titanium.

Figure 3:
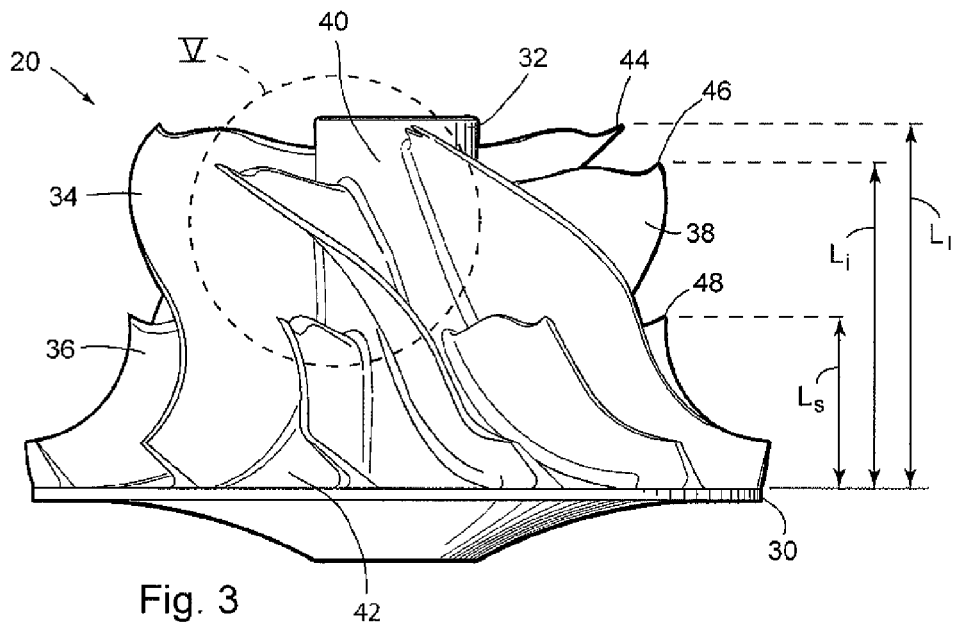
FIG. 3 is an elevational side view of the compressor wheel shown in FIG. 2.

Hub 32 includes an upper cylindrical section 40 and a lower section 42 having a truncated bell-shape which can be seen in FIGS. 2 and 3. In cross-section, the truncated bell-shape has a shape of a truncated Gaussian curve.

As shown in the illustrated embodiment, the different types of blades are arranged around hub 32 such that any two adjacent blades are of a different type, meaning that adjacent blades have at least one dimension that is substantially different from an adjacent blade. As shown in FIG. 3, illustrated compressor wheel 20 includes three different types of blades, including long blades 34 having a length $L_l$, intermediate length blades having a length $L_i$, and short blades having a length $L_s$. The length of the blades are measured from opposite extremes along the axially direction (i.e., from the upper surface of the edge of the disk portion 30 in an axially direction to the tip 44, 46 or 48 of each of the long, intermediate and short blades, respectively, or other portion of the blade that is the most displaced from the disk portion). Alternatively, the length of a blade is regarded as the axially distance (i.e., axial displacement) from an upper surface of the disk portion 30 to that point of a blade that is farthest from the disk portion.

While the illustrated compressor wheel 20 has three different types of blades having three different lengths, is expected that enhanced performance characteristics can also be achieved with four or more different types of blades (e.g., four or more blades having different lengths).

The total number of blades can be an integer multiple of the number of different types of blades employed on the compressor wheel 20. For example, when three different blades of different length are employed, the blades may be arranged around the hub, either clockwise or counterclockwise (these variations being mirror images of each other), in a repeating sequence of tall blade, short blade and intermediate length blade. The blades may also be arranged around the hub, either clockwise or counterclockwise, in a repeating sequence of tall blade, short blade, intermediate blade, and short blade, with the total number of blades being a multiple of two or four. In the case where an even number of blades is used, the total number of blades can be selected from, for example, 12, 14, 16 or 18. In those cases where the total number blades is an integer multiple of 2 and not an integer multiple of 4 (e.g., 14 or 18), the repeating sequence of three different types of blades will necessarily include a deviation. For example, for 14 blades, the sequence can be repeated three times and partially completed a fourth time. In the case where a multiple of three blades is used, the total number of blades can be selected from, for example, 9, 12, 15 or 18 blades.

Figure 4:
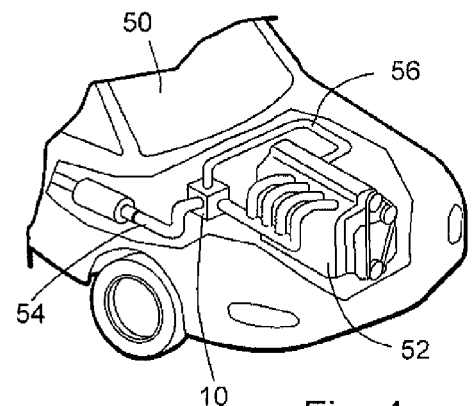
FIG. 4 is a schematic representation of a vehicle incorporating a turbocharger.
Figure 5:
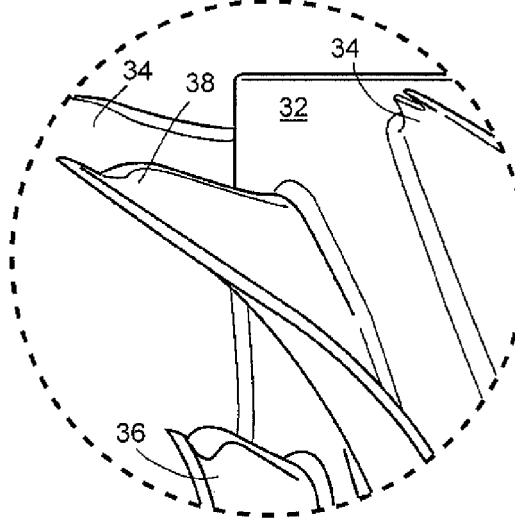
FIG. 5 is a perspective view of an embodiment in which three blades of different lengths are arranged in a repeating sequence of short, intermediate and long.

Shown in FIG. 4 is a perspective view of a vehicle 50 having an internal combustion engine 52. The exhaust gas generated in the internal combustion engine 52 leaves the internal combustion engine and flows through a turbine 14 (FIG. 1) of a turbocharger 10 before being discharged through exhaust pipe 54, and compressed air is conveyed from the compressor section of turbocharger 10 to the air intake of internal combustion engine 52 via conduit 56.

Testing has confirmed that the use of illustrated compressor wheel 20 with a diesel engine provides an average of about 8% more power and 12% more airflow than on otherwise identical arrangement having two sets of blades of different heights. While not wishing to be bound by any particular theory, it is believed that employing three different types of blades, each having different dimensions, provides three stages of compression employing a single wheel.

The described embodiments are preferred and/or illustrated, but are not limiting. Various modifications are considered within the purview and scope of the appended claims.

What is claimed is:

1. A compression wheel comprising:
    a base; and
    a plurality of blades extending from the base, each blade having a length defined by the distance between opposite axial extremities of the blade, the plurality of blades including a long type of blade having a length that is greater than the length of the other two types of blades, an intermediate type of blade having a length that is less than the length of the long blades and greater than a length of a short blade, the short blade having a length less than that of the other types of blades, and wherein the total number of blades is an integer multiple of three and the blades are arranged around a hub portion of the base in a repeating sequence, either clockwise or counterclockwise, of tall blade, short blade and intermediate blade.

2. A compression wheel of claim 1, in which each of the different types of blades has a finite length that is at least 0.1 inches (2.54 millimeters) different from the length of the other types of blades.

3. A compression wheel of claim 1, in which each of the different types of blades has a finite length, the length of each blade being at least 5% greater than the length of any type of blade having a shorter length.

4. A compression wheel of claim 1, in which the total number of blades is selected from the group consisting of 9, 12, 15 and 18 blades.

5. A compression wheel of claim 1, in which the hub portion includes a cylindrical portion that smoothly transitions into a bell-shaped portion.

6. A compressor comprising:
    a compressor housing having an air inlet and a compressed air outlet; and
    a compressor wheel disposed in the compressor housing, the compressor wheel including a base and a plurality of blades extending from the base, each blade having a length defined by the distance between opposite axial extremities of the blade, the plurality of blades including a long type of blade having a length that is greater than the length of the other two types of blades, an intermediate type of blade having a length that is less than the length of the long blades and greater than a length of a short blade, the short blade having a length less than that of the other types of blades, and wherein the total number of blades is an integer multiple of three and the blades are arranged around a hub portion of the base in a repeating sequence, either clockwise or counterclockwise, of tall blade, short blade and intermediate blade.

7. A compressor of claim 6, in which each of the different types of blades has a finite length that is at least 0.1 inches (2.54 millimeters) different from the length of the other types of blades.

8. A compressor of claim 6, in which the length of each type of blade is finite and at least 5% greater than the length of any different type of blade having a shorter length.

9. A turbocharger comprising:
    a shaft journaled within a turbocharger housing;
    a turbine mounted on an end of the shaft, the turbine and housing configured to receive exhaust gases from an internal combustion engine at an inlet and discharge the exhaust gases; and
    a compressor wheel mounted on another end of the shaft, the compressor wheel and housing configured to receive air from an axial inlet and discharge compressed air radially, wherein the compressor wheel includes a base and a plurality of blades extending from the base, each blade having a length defined by the distance between opposite axial extremities of the blade, the plurality of blades including a long type of blade having a length that is greater than the length of the other two types of blades, an intermediate type of blade having a length that is less than the length of the long blades and greater than a length of a short blade, the short blade having a length less than that of the other types of blades, and wherein the total number of blades is an integer multiple of three and the blades are arranged around a hub portion of the base in a repeating sequence, either clockwise or counterclockwise, of tall blade, short blade and intermediate blade.

10. A turbocharger of claim 9, in which each of the different types of blades has a finite length that is at least 0.1 inches (2.54 millimeters) different from the length of the other types of blades.

11. A turbocharger of claim 9, in which the length of each type of blade is finite and at least 5% greater than the length of the any different type of blade having a shorter length.

12. A motor vehicle comprising:
    an internal combustion engine mounted on the vehicle;
    a turbocharger mounted on the vehicle, the turbocharger including a shaft journaled within a housing, a turbine mounted on an end of the shaft, the turbine and housing configured to receive exhaust gases at an inlet and discharge the exhaust gases, a compressor wheel mounted on another end of the shaft, the compressor wheel and housing configured to receive air from an axial inlet and discharge compressed air radially, wherein the compressor wheel includes a base and a plurality of blades extending from the base, each blade having a length defined by the distance between opposite axial extremities of the blade, the plurality of blades including a long type of blade having a length that is greater than the length of the other two types of blades, an intermediate type of blade having a length that is less than the length of the long blades and greater than a length of a short blade, the short blade having a length less than that of the other types of blades, and wherein the total number of blades is an integer multiple of three and the blades are arranged around a hub portion of the base in a repeating sequence, either clockwise or counterclockwise, of tall blade, short blade and intermediate blade;
    an exhaust conduit for conveying exhaust gases from the internal combustion engine to the radial inlet of the turbine; and
    a compressed air conduit for conveying compressed air from an outlet of the compressor to an air inlet of the internal combustion engine.

* * * * *